Aug. 25, 1964     A. J. SOBEY     3,145,530
MULTISTAGE ROCKET
Filed Sept. 27, 1962
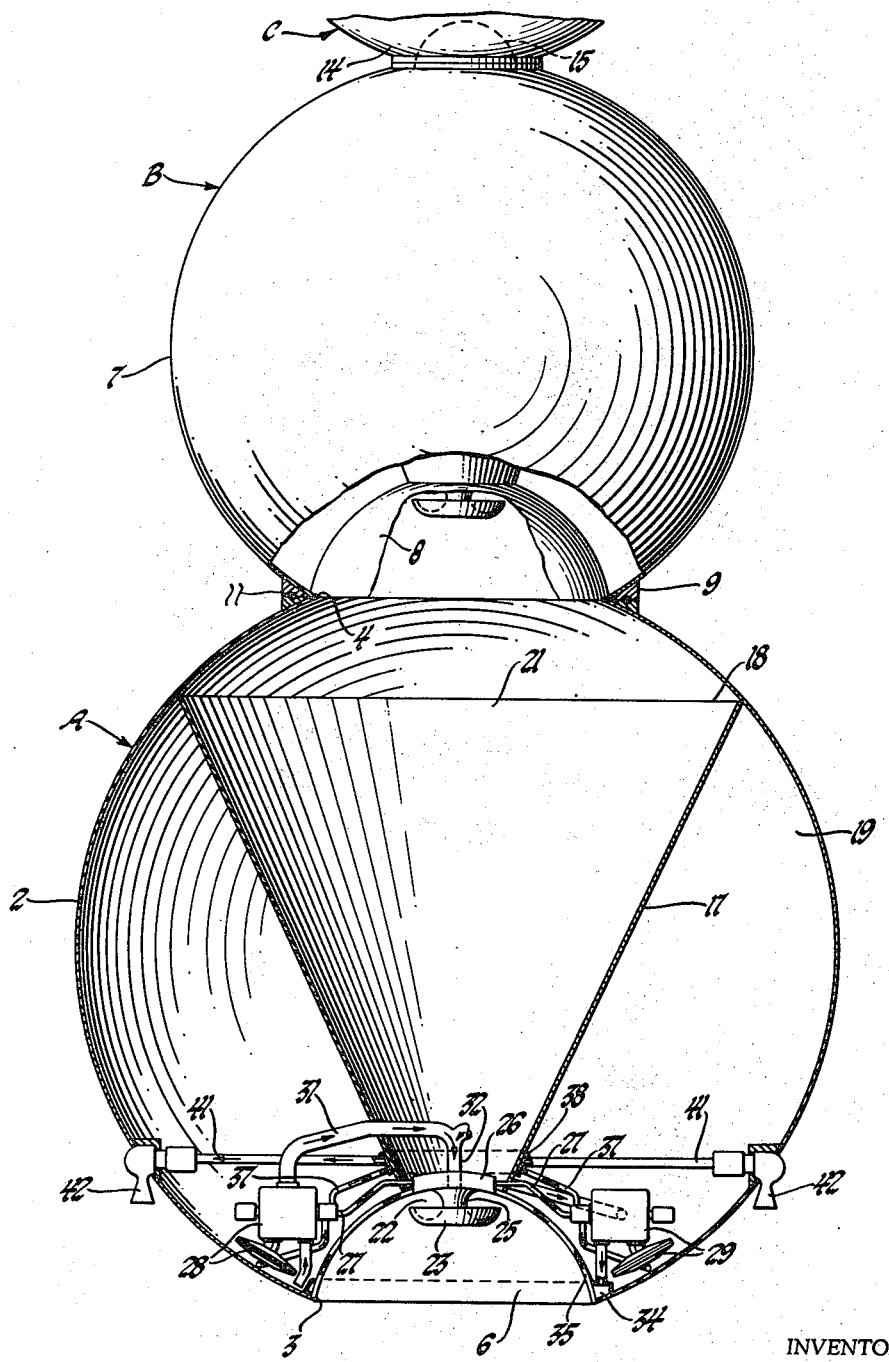
INVENTOR.
Albert J. Sobey
BY
Paul Fitzpatrick
ATTORNEY 3,145,530
MULTISTAGE ROCKET
Albert J. Sobey, Indianapolis, Ind., assignor to General Motors Corporation, Detroit, Mich., a corporation of Delaware
Filed Sept. 27, 1962, Ser. No. 226,594
4 Claims. (Cl. 60—35.6)

My invention relates to rocket vehicles having more than one stage; especially to the general configuration or layout of the stages. The principal objects of my invention are to make the most efficient use of the structural materials of the rocket so as to minimize the weight of the vehicle apart from that of the propellant, thus to increase the overall efficiency of the vehicle.

In general outline, these objects are achieved by using a globular, preferably a spherical, rocket case; by recessing the propulsion nozzle within the sperical outline of the case; and by utilizing the capacity of the rocket nozzle of the succeeding stage as part of the propellant space of the given stage. Another advantage of the invention is a staged rocket which is less attenuated and therefore more readily serviced than cylindrical rocket stages commonly employed.

It is well known that the ultimate velocity of a rocket vehicle or stage, as well as the useful work it can do in accelerating later stages are reduced by any increase in the dead weight of the vehicle; that is, the skin, tanks, pumps, and rocket engines, as well as other miscellaneous hardware. It is also known, of course, that a spherical body has the largest possible ratio of volume to surface. I propose to take advantage of this fact to maximize the ratio of propellant weight to total vehicle weight.

The nature of the invention will be clearly apparent from the succeeding description of the preferred embodiment of the invention and the accompanying drawing which illustrates the first two stages of a multistage rocket vehicle.

Referring to the drawings, the vehicle comprises a first stage rocket A, having a spherical case 2 with a circular opening 3 at its lower end and a circular opening 4 at its upper end. The dome-shaped nozzle 6 of the rocket engine is mounted within the outline of the case, the rim of the exit of the nozzle being fixed to the case so as to close the opening 3. A second stage rocket B comprises a similar spherical case 7 having a nozzle 8 mounted in an opening in its lower end 7. The diameter of nozzle 8 and that of the opening 4 in the first stage rocket are substantially the same so that the edges of the openings in the two cases substantially coincide. A suitable interstage joint or connection 9, the details of which are immaterial to this invention, is provided at this point. This connection may take the form of any suitable means for securing together and quickly separating the two stages. For example, the explosive material indicated at 11 may be ignited to sever the joint 9. The existence of a third stage rocket C having a case 14 and nozzle 15 is suggested at the top of the drawing. Any number of stages may be provided.

The first stage case is substantially entirely filled with propellant. A frusto-conical partition 17, extending from the nozzle 6 to a circular sealed joint with the case 2 at its upper edge 18, divides the case into two propellant compartments. An outer compartment 19 contains an oxidizer, and an inner compartment 21 contains fuel. It will be noted that the inner compartment 21 includes the interior of nozzle 8. The cone angle of the partition 17 is such as to provide the required ratio of spaces for fuel and oxidizer. The fuel may be a hydrocarbon type fuel and the oxidizer may be liquid oxygen.

The foregoing explains the basic principles of the invention, but it may be desirable to describe briefly some of the mechanism shown on the drawing. The combustion chamber of the rocket engine is a toroidal space 22 enclosed by a mushroom-shaped head 23 extending from the base of the nozzle 6. The nozzle throat is at 25 and expansion takes place through the nozzle beyond this throat. The details of the means for mixing and burning fuel in chamber 22 are not described.

Fuel and oxidizer may be supplied to the rocket engine by any suitable system, preferably one such as that described in my U.S. patent application Serial No. 162,677, filed December 28, 1961. In this system, fuel and oxidizer are supplied to a gas generator which may be an annular combustion apparatus indicated at 26. The gases from the gas generator are delivered through pipes 27 to pumping devices 28 for the fuel and 29 for the oxidizer. There may be two or more of each of these pumping devices. The fuel pumping devices discharge through lines 31 to a common fuel conduit 32 entering the head 23. The oxidizer is delivered to a manifold 34 from which it flows through a tubular wall structure 35 of nozzle 8 to the combustion apparatus. The fuel propelling gases are discharged from the pumping devices 28 and 29 through lines 37 to an annular manifold 38, from which they flow through pipes 41 to swivel nozzles 42 provided for attitude control of the vehicle. The means for steering nozzles 42 will not be described. The structure of succeeding stages may be similar to that just described or may be quite different, depending upon requirements.

It will be apparent from the foregoing that the rocket structure of the invention provides a maximum of tankage and a minimum of vehicle weight and has the ultimate result of the most efficient use of the fuel.

The detailed description of the preferred embodiment of the invention is not to be considered as limiting the invention. Many modifications may be made by the exercise of skill in the art.

I claim:

1. A multistage rocket vehicle comprising a plurality of rocket stages each comprising a globular case adapted to contain propellant and a propulsion nozzle disposed within the outline of the case, the case being open at the end opposite the nozzle, the nozzle of one stage being disposed over and closing the said opening of the next preceding stage, and completing the propellant enclosure so that the volume within the nozzle is available to contain propellant for the next preceding stage, and a separation joint between the said stages at the juncture thereof.

2. A multistage rocket as recited in claim 1 in which the propulsion nozzle is of the inverted plug type.

3. A multistage rocket vehicle comprising a plurality of rocket stages each comprising a globular case, a propulsion nozzle disposed within the outline of the case, and a frusto-conical partition extending and diverging from the nozzle end of the stage and dividing the case into two compartments for propellants, the case being open at the end opposite the nozzle, the nozzle of one stage being disposed over and closing the said opening of the next preceding stage, and completing the enclosure of one propellant compartment, so that the volume within the nozzle is available to contain propellant for the next preceding stage, and a separation joint between the said stages at the juncture thereof.

4. A multistage rocket as recited in claim 3 in which the propulsion nozzle is of the inverted plug type.

No references cited.